(12) United States Patent
Hoxie et al.

(10) Patent No.: US 9,651,102 B2
(45) Date of Patent: May 16, 2017

(54) BRAKE PAD APPARATUS

(71) Applicant: BeijingWest Industries Co., Ltd., Beijing (CN)

(72) Inventors: Steven Glenn Hoxie, Howell, MI (US); William Myers, Centerville, OH (US)

(73) Assignee: BeijingWest Industries Co., Ltd., Shanghai (CN)

( * ) Notice: Subject to any disclaimer, the term of this patent is extended or adjusted under 35 U.S.C. 154(b) by 0 days.

(21) Appl. No.: 14/941,943

(22) Filed: Nov. 16, 2015

(65) Prior Publication Data

US 2016/0245350 A1     Aug. 25, 2016

Related U.S. Application Data

(60) Provisional application No. 62/118,182, filed on Feb. 19, 2015.

(51) Int. Cl.
| | |
|---|---|
| *F16D 65/00* | (2006.01) |
| *F16D 65/092* | (2006.01) |
| *F16D 55/00* | (2006.01) |

(52) U.S. Cl.
CPC ....... *F16D 65/0006* (2013.01); *F16D 65/092* (2013.01); *F16D 2055/0029* (2013.01)

(58) Field of Classification Search
CPC . F16D 65/0006; F16D 65/0068; F16D 65/092
See application file for complete search history.

(56) References Cited

U.S. PATENT DOCUMENTS

| | | | |
|---|---|---|---|
| 4,093,045 A | 6/1978 | Kawamura | |
| 4,603,760 A | 8/1986 | Myers | |
| 5,427,213 A | 6/1995 | Weiler et al. | |
| 5,518,088 A | 5/1996 | Brosilow | |

(Continued)

FOREIGN PATENT DOCUMENTS

| | | |
|---|---|---|
| DE | 4112947 A1 | 10/1992 |
| DE | 4126339 A1 | 2/1993 |

(Continued)

OTHER PUBLICATIONS

German Office Action, Dated Oct. 19, 2016, 7 Pages.
Japanese Office Action, Dated Nov. 1, 2016, 6 Pages.
German Office Action; Dated Feb. 20, 2017; Eight (8) Pages.

*Primary Examiner* — Vishal Sahni
(74) *Attorney, Agent, or Firm* — William H. Honaker; Dickinson Wright PLLC

(57) ABSTRACT

The invention provides for a brake pad apparatus for connecting to a brake assembly of a motor vehicle. The brake pad apparatus includes a backing plate that extends along a first plane and has an inside surface and an outside surface. A liner is connected to the inside surface of the backing plate for contacting the rotor for creating a frictional force against the rotor to slow the motor vehicle. An insulating layer is connected to the outside surface of the backing plate for providing heat and noise insulation during contact of the liner against the rotor. At least one projection extends from the outside surface of the backing plate through the insulating layer, and past the insulating layer for being engaged by a pressing member of the brake assembly for compressing the liner against the rotor of the brake assembly.

15 Claims, 7 Drawing Sheets

(56) References Cited

U.S. PATENT DOCUMENTS

| | | | |
|---|---|---|---|
| 5,842,546 A | * | 12/1998 | Biswas ................ F16D 65/092 |
| | | | 188/250 B |
| 6,135,244 A | * | 10/2000 | Le Bris ............... F16D 65/0006 |
| | | | 188/250 B |
| 6,182,799 B1 | | 2/2001 | Reuter et al. |
| 6,193,024 B1 | | 2/2001 | Heppes et al. |
| 6,913,120 B2 | | 7/2005 | Bosco et al. |
| 7,367,433 B2 | | 5/2008 | Bieker et al. |
| 7,481,304 B2 | | 1/2009 | Tsurumi et al. |
| 7,905,333 B2 | | 3/2011 | Denys |
| 2012/0228069 A1 | | 9/2012 | Kulis, Jr. et al. |

FOREIGN PATENT DOCUMENTS

| | | |
|---|---|---|
| DE | 19905529 C1 | 6/2000 |
| DE | 19958851 A1 | 8/2000 |
| DE | 20115073 U1 | 11/2001 |
| DE | 102005037483 A1 | 3/2007 |
| DE | 102007025113 A1 | 12/2008 |
| DE | 102009009567 A1 | 9/2009 |
| GB | 2115507 A | 9/1983 |
| JP | H05193466 A | 8/1993 |
| JP | 2007263276 A | 10/2007 |
| JP | 2014126066 A | 7/2014 |

\* cited by examiner

BRAKE PAD APPARATUS

CROSS REFERENCE TO RELATED APPLICATIONS

This U.S. patent application Ser. No. claims the benefit of U.S. Provisional Patent Application Ser. No. 62/118,182 filed on Feb. 19, 2015 entitled "BRAKE PAD APPARATUS," the entire disclosure of the application being considered part of the disclosure of this application and hereby incorporated by reference.

BACKGROUND OF THE INVENTION

1. Field of the Invention

A brake pad apparatus. More particularly, a brake pad apparatus including at least one projection extending past an insulating layer of the brake pad apparatus for being engaged by a pressing member of a brake assembly.

2. Description of the Prior Art

Conventional disc brake assemblies for vehicles generally include a pair of brake pads which are disposed on opposing sides of a brake rotor and are drawn against the rotor to create a frictional clamp force, which in turn slows the vehicle. The frictional clamp force is typically generated by way of at least one hydraulic pressure-actuated pressing member, such as a piston, which is contained in a brake caliper that pushes against one of the pads. On typical fixed-caliper type brake assemblies, the pressing member is a piston which is drawn against both the inboard and outboard pads, whereas on floating-caliper type brake assemblies, a piston-style pressing member is drawn against the inboard pad and a pair of caliper finger-style pressing members are drawn against the outboard pad.

Brake pads typically include a planar backing plate that has an inside surface and an outside surface. A liner, i.e., friction material, is connected to the inside surface of the backing plate for contacting the rotor to create the frictional clamping force against the rotor. It is further known in the art to attach an insulating layer, i.e., a shim, to the outside surface of the backing plate to provide noise and heat insulation during contact of the liner against the rotor. The insulating layer usually covers a large portion of the backing plate area, including the area that is directly aligned with the contact face of the piston(s), and in the case of floating calipers, under the caliper fingers on the outboard side. Therefore, the insulating layer is engaged by the piston(s)/caliper fingers during compression of the brake pad.

Along with the positive insulative characteristics that are provided by the insulating layer, it has also been recognized that as a result of the pressing member directly engaging the insulating layer, the brake assembly may be subjected to higher drag torque and larger amounts of brake fluid consumption (displacement). An important metric to caliper performance is minimizing drag torque and fluid consumption of which total compliance of the caliper housing and brake pad assemblies is a major contributor. Accordingly, there remains a need for improvements to such brake pad apparatuses to provide better performance characteristics during operation of the brake assembly.

SUMMARY OF THE INVENTION

An improved brake pad apparatus is provided for engaging a rotor of a brake assembly of a vehicle to reduce the speed of the vehicle. The brake pad apparatus includes a backing plate that has an inside surface and an outside surface. A liner is connected to the inside surface of the backing plate for contacting the rotor for creating a frictional force against the rotor to reduce the speed of the vehicle. An insulating layer is connected to the outside surface of the backing plate for providing heat and noise insulation to the backing plate during contact of the liner against the rotor. At least one projection extends from the outside surface of the backing plate through the insulating layer and past the insulating layer to an engagement surface for being engaged by a pressing member of the brake assembly while preventing the pressing member from engaging the insulating member.

Additionally, an improved brake assembly of a vehicle is provided. The brake assembly includes a brake pad apparatus including a backing plate that has an inside surface and an outside surface. A liner is connected to the inside surface of the backing plate for contacting the rotor for creating a frictional force against the rotor to reduce the speed of the vehicle. An insulating layer is connected to the outside surface of the backing plate for providing heat and noise insulation to the backing plate during contact of the liner against the rotor. At least one projection extends from the outside surface of the backing plate through the insulating layer and past the insulating layer to an engagement surface. At least one pressing member is disposed in alignment with the at least one projection for engaging the at least one engagement surface of the at least one projection without contacting the insulating layer.

The invention in its broadest aspect therefore circumvents the issues of the insulating layer being constrained by the pressing member by providing for direct contact between the projections and the pressing member. Therefore, the damping properties of the insulating layer remain active over the backing plate while the issues associated with clamping thereof are alleviated. Accordingly, improvements in both brake drag reduction and fluid consumption are provided to the brake assembly, which consequently also provides improved fuel economy and brake pedal feel.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a brake pad apparatus 20, 120, 220, 320 is generally shown for engaging a rotor of a brake assembly of a vehicle for reducing the speed of the vehicle. It should be appreciated that the subject brake pad apparatus 20, 120, 220, 320 could be utilized on various vehicles including, but not limited to, automobiles and motorcycles.

Figure 1:
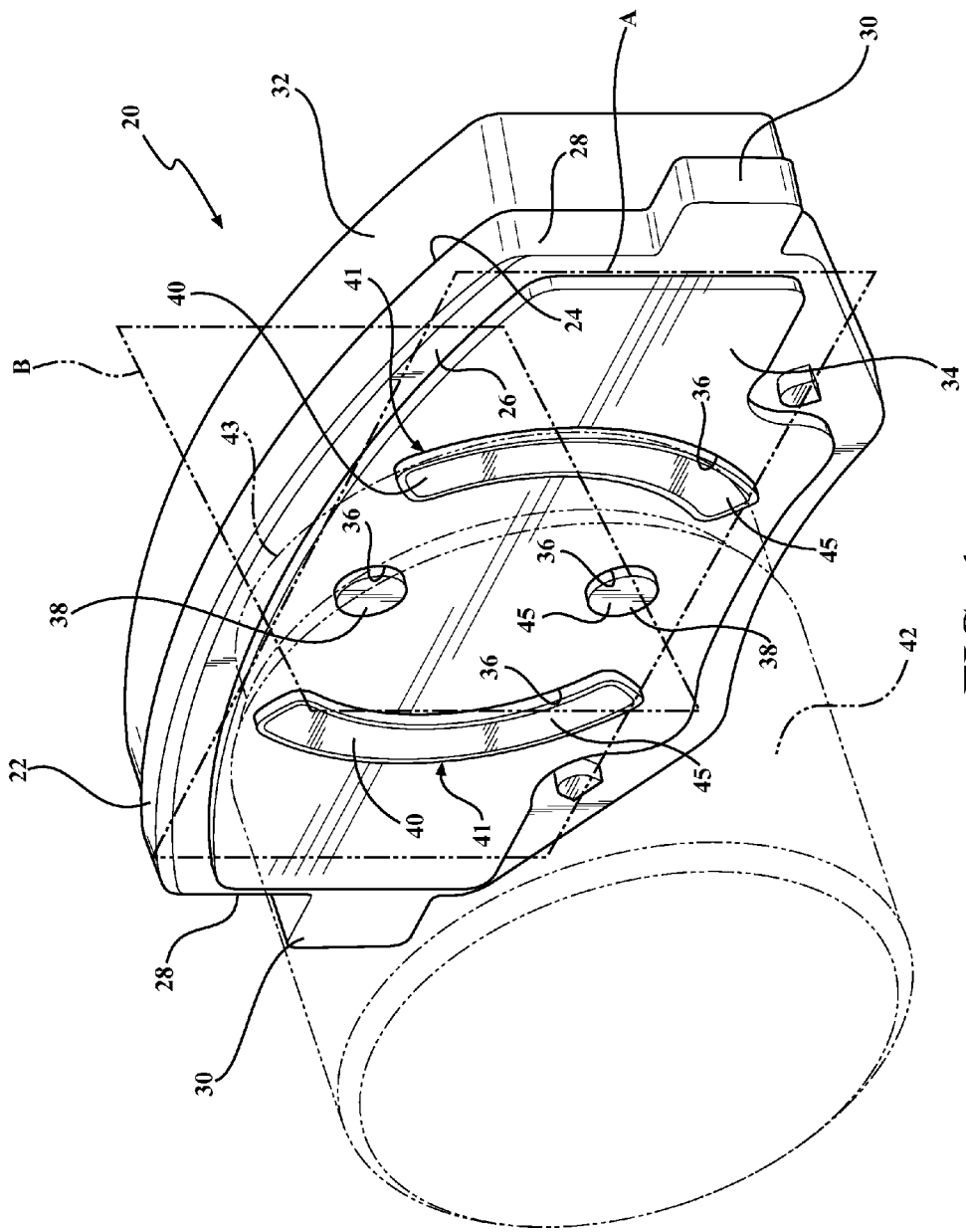
FIG. 1 is a perspective view of a first example embodiment of a brake pad apparatus in engagement with a piston of a brake assembly.

As best shown in FIG. 1, the brake pad apparatus 20, 120, 220, 320 includes a backing plate 22 made of a steel material that extends along a first plane A. The backing plate 22 has an inside surface 24 and an outside surface 26, and extends between a pair of sides 28. It should be appreciated that the backing plate 22 could be made of other materials such as, but not limited to, other metals or organic polymer materials.

A pair of tabs 30 each extend from one of the sides 28 of the backing plate 22 for being received by a mounting bracket of the brake assembly for mounting the brake pad apparatus 20, 12, 220, 320 in position adjacent to a rotor of the brake assembly. It should be appreciated that more or fewer tabs 30 could extend from the backing plate 22, and the tabs 30 could extend from other areas of the backing plate 22, depending on the configuration of the brake assembly.

A liner 32, i.e., friction pad, is connected to the inside surface 24 of the backing plate 22 for contacting the rotor for creating a frictional force against the rotor to slow the vehicle. It should be appreciated that the liner 32 could be made of various materials as known in the art.

An insulating layer 34, i.e., a shim, is connected to the outside surface 26 of the backing plate 22 for providing noise and heat insulation during contact of the liner 32 against the rotor. In the example embodiment, the insulating layer 34 is comprised of a plurality of layers of adhesive, rubber and steel materials, however, other combinations of materials could be used to provide insulating properties needed for specific application/configurations of the brake assembly. As best presented in FIG. 7, the insulating layer 34 extends perpendicularly to the first plane A from the backing plate 22 by a thickness T. The insulating layer 34 may be connected to the outside surface 26 of the backing plate 22 with various attaching mechanisms such as, but not limited to, an adhesive and screws.

The insulating layer 34 defines at least one opening 36 that extends therethrough. At least one projection 38, 40, 140, 240, 340 extends from the outside surface 26 of the backing plate 22 through one of the openings 36 and past the insulating layer 34 to an engagement surface 45 for being engaged by the pressing members, i.e, piston(s) 42/caliper fingers 44, of the brake assembly for compressing the liner 32 against the rotor. Because the projection(s) 38, 40, 140, 240, 340 extend past the insulating layer 34, contact is be made between the projection(s) 38, 40, 140, 240, 340 and the pressing member 42, 44 rather than between the insulating layer 24 and the pressing member 42, 44. This improves the performance of the brake assembly while the noise and heat damping properties of the insulating layer 34 are maintained. Said another way, the projection(s) 38, 40, 140, 240, 340 allow the damping properties of the insulating layer 34 to remain active over the backing plate 22 while alleviating issues associated with clamping of the insulating layer 34 since the projection(s) 38, 40, 140, 240, 340 engage the pressing member 42, 44 rather than the insulating layer 34. Accordingly, the projection(s) 28, 40, 140, 240, 340 provide improvements in both brake drag reduction and fluid consumption to the brake assembly, which consequently also provides improved fuel economy and brake pedal feel.

As shown in the Figures, the engagement surface 45 of each of the projection(s) 38, 40, 140, 240, 340 is planar and extends in spaced and substantially parallel relationship with the outside surface 26 of the backing plate 22. It should be appreciated that this provides for a large amount of surface area of the pressing member 42, 44 against the projection 38, 40, 140, 240, 340, thereby providing for even contact of the liner 32 against the rotor and consistent wear of the projections 38, 40, 130, 240, 340 and liner 32 during use.

Figure 7:
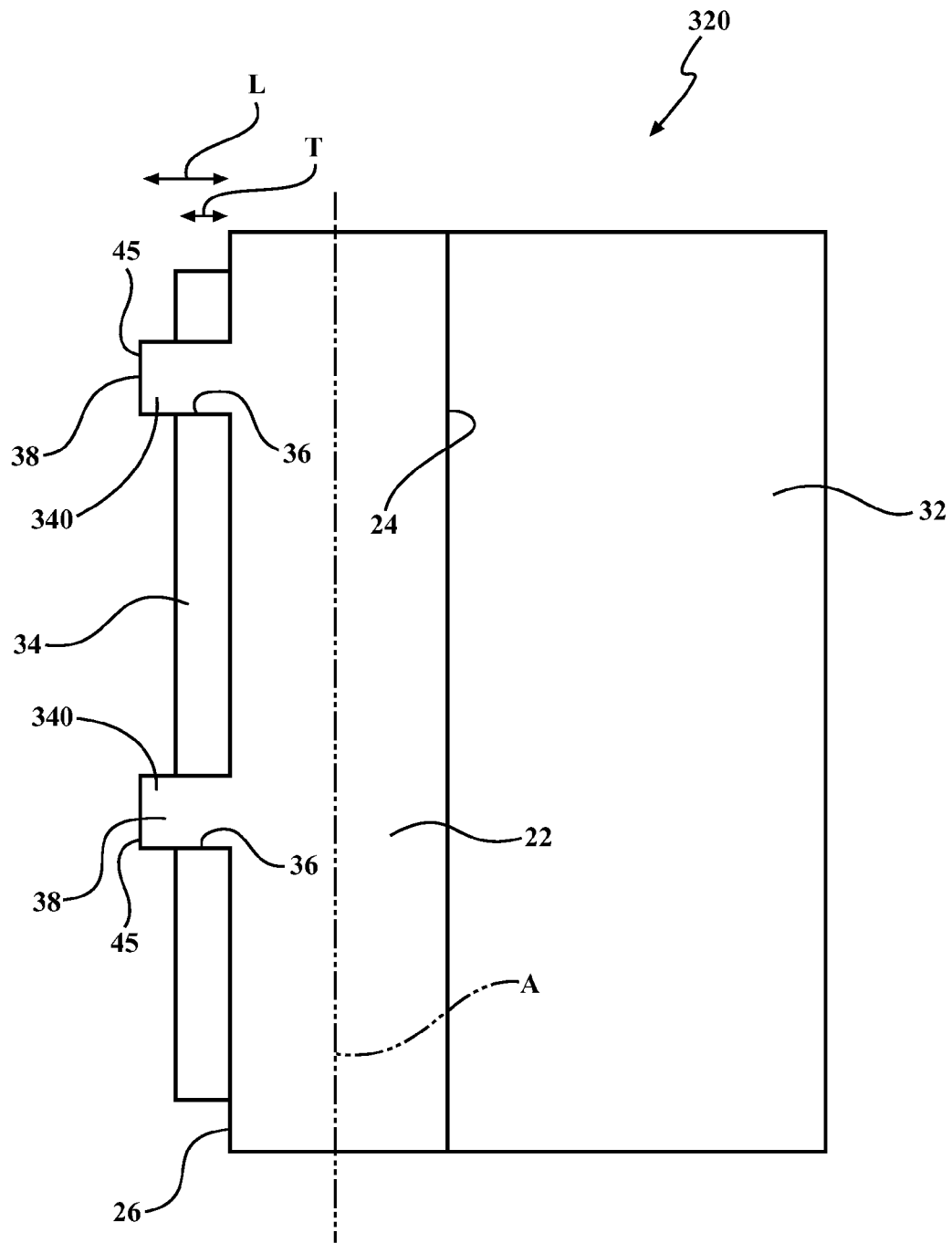
FIG. 7 is a side cross-sectional view of a fourth example embodiment of the brake pad apparatus demonstrating a thickness of an insulating layer and length of projections.

As best shown in an embodiment of the apparatus 320 shown in FIG. 7, a plurality of projections 38, 40, 140, 240, 340 extend perpendicularly to the first plane A from the backing plate 22 by a length L of the insulating layer 34 that is greater than the thickness T for allowing the projections 38, 40, 140, 240, 340 to directly contact the pressing member 42, 44 of the brake assembly (without engagement of the pressing member 42, 44 against the insulating layer 34). It should be appreciated that the projections 38, 40, 140, 240, 340 could extend to different lengths from one another based on design needs, but should extend past the insulating layer 34. It should be appreciated that the perpendicular relationship of the projections 38, 40, 140, 240, 340 relative to the first plane provides for even contact of the liner 32 against the rotor and consistent wear of the projections 38, 40, 130, 240, 340 and liner 32 during use.

In the example embodiments, each of the projections 38, 40, 140, 240, 340 are made of the same material as the backing plate 22, i.e., steel, but it should be appreciated that they could be made of other materials. Further, in the example embodiment, the projections 38, 40, 140, 240, 340 are stamped through the backing plate 22, however, alternatively a second material could be attached to the backing plate 22 to create the projections 38, 40, 140, 240, 340. In such a configuration, the projections 38, 40, 140, 240, 340 could be made integral with the backing plate 22 through welding or the like.

Figure 2:
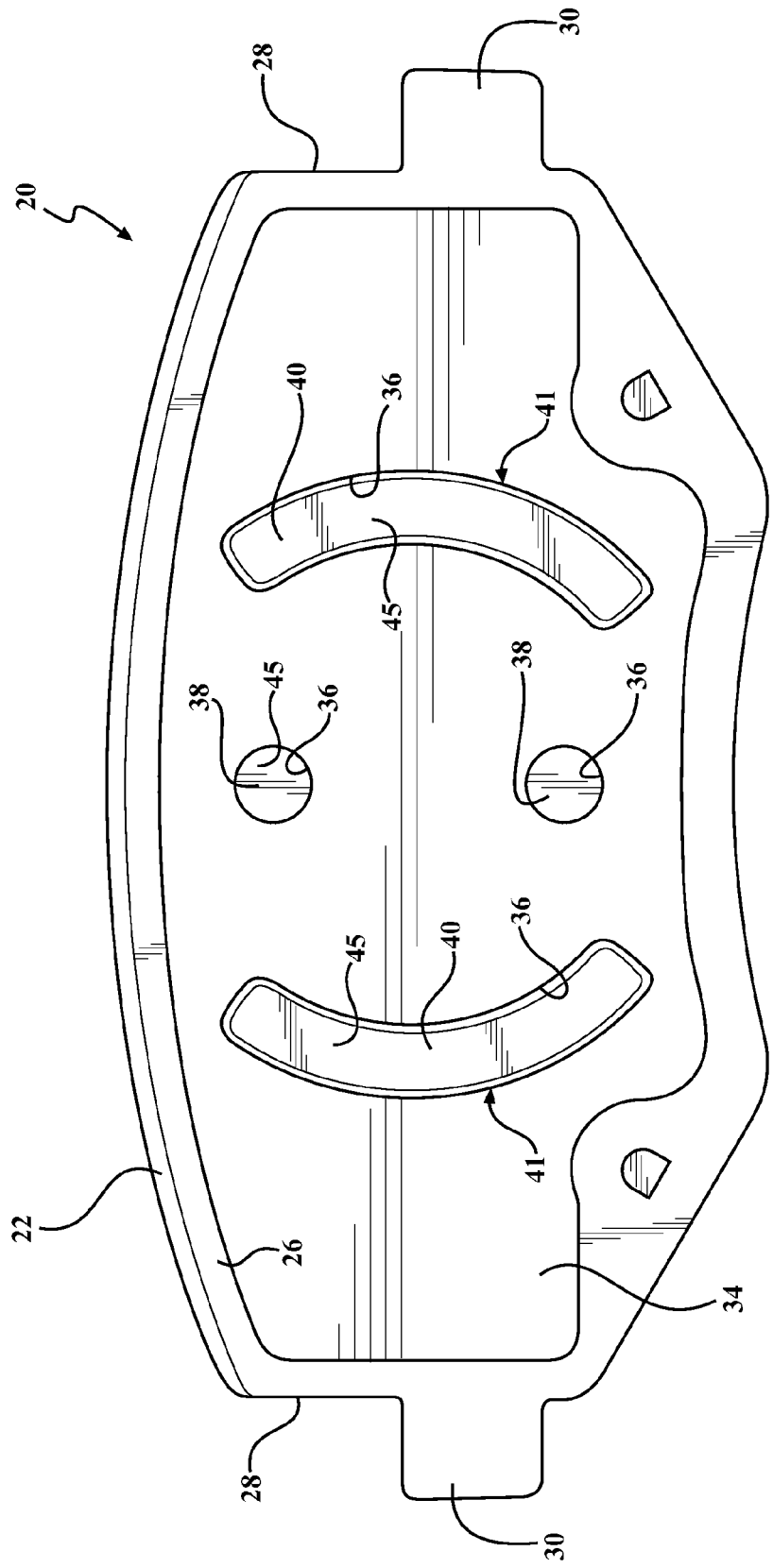
FIG. 2 is a front view of the first example embodiment of the brake pad apparatus.
Figure 4:
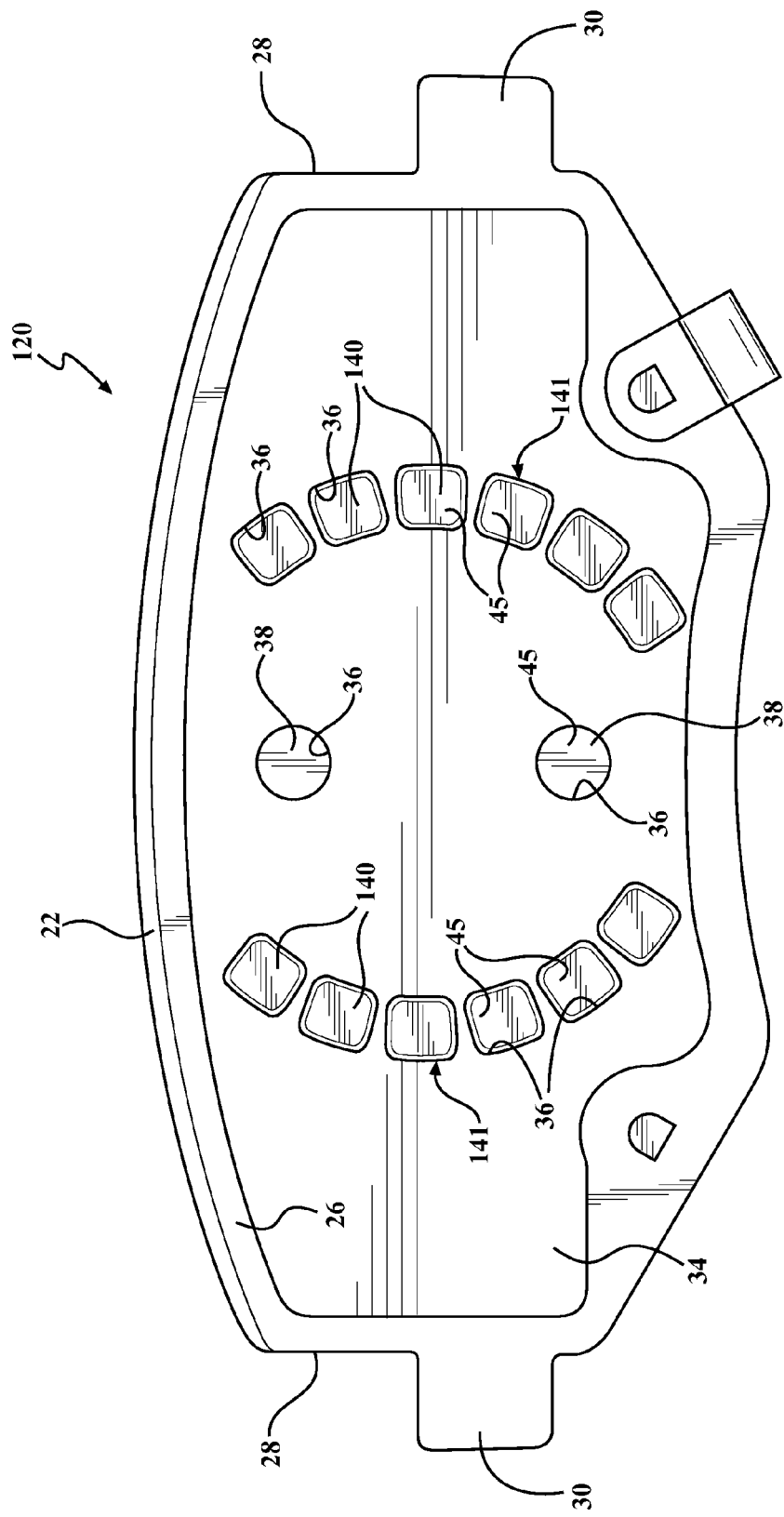
FIG. 4 is a front view of the second example embodiment of the brake pad apparatus.
Figure 6:
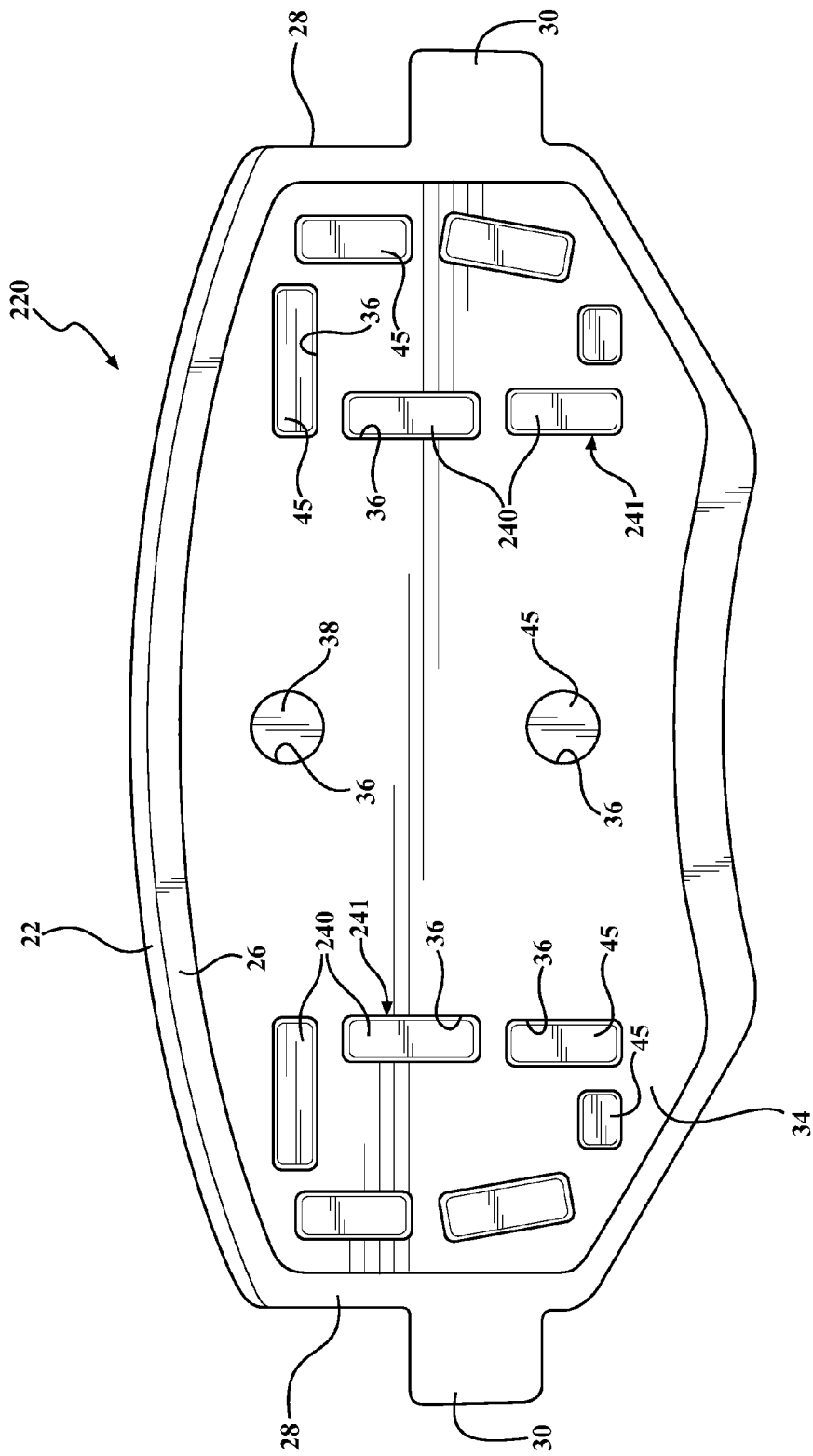
FIG. 6 is a front view of the third example embodiment of the brake pad apparatus.

As best shown in FIGS. 2, 4 and 6, the example embodiments of the subject invention include a plurality of projections 38, 40, 140, 240, 340 includes a pair of inside projections 38 and a plurality of outside projections 40, 140, 240, 340. The inside projections 38 and the outside projections 40, 140, 240, 340 are spaced from one another. It should be appreciated that spacing the projections 38, 40, 140, 240, 340 from one another allows the insulating layer 34 to maintain continuity across the backing plate 22 to provide for ease of assembly of the brake pad apparatus 20. Said another way, the insulating layer 34 advantageously can be attached to the outside surface 26 of the backing plate 22 as a single entity—it does not have to be segmented into multiple pieces to be attached to the backing plate 22.

Figure 3:
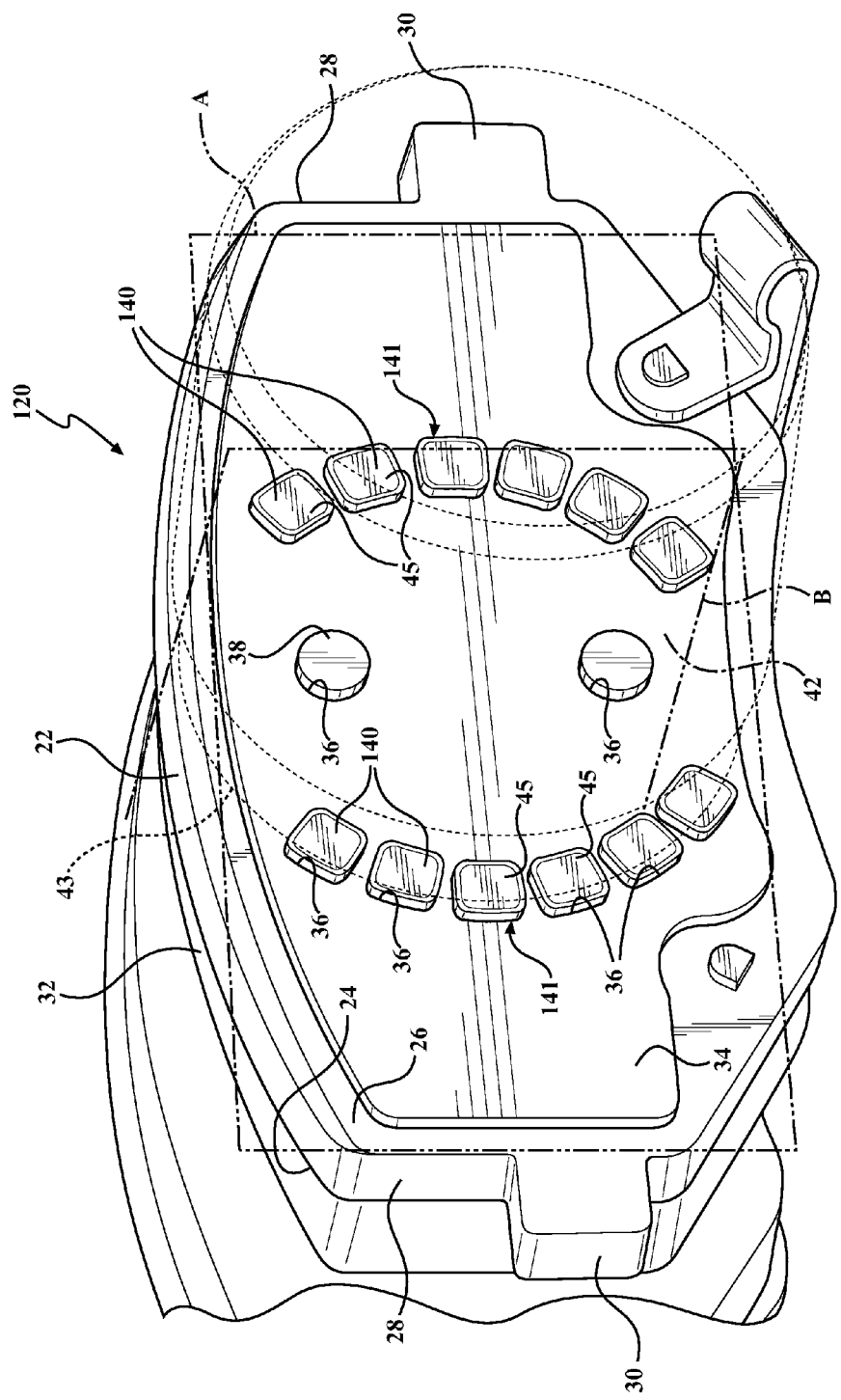
FIG. 3 is a perspective view of a second example embodiment of a brake pad apparatus in engagement with a piston of a brake assembly.

As best shown in FIGS. 1 and 3, the pair of inside projections 38 are disposed in linearly spaced-relationship with one another along a second plane B that extends perpendicularly to the first plane A halfway between the sides 28 of the backing plate 22.

In the first example embodiment best presented in FIGS. 1 and 2, the plurality of outside projections 40 includes a pair of arcuate projections 41 that each extend in an arc shape and are a mirror image of one another on opposite sides 28 of the second plane B. As best presented in FIG. 1, in this configuration the pressing member 42 is a piston 42, and each of the arcuate projections 41 are aligned with the piston 42 for being engaged by the piston 42. More specifically, the arcuate projections 41 are disposed in alignment with an engagement face of the piston 42 adjacent to an outer circumference 43 of the engagement face of the piston 42, and the arcuate shape of the arcuate projections 41 correlates with the shape of the engagement face of the piston 42. Accordingly, the arcuate projections 41 are shaped and sized for optimal aligned engagement of the projections 40 and piston 42 without the risk of the piston 42 engaging the insulating layer 34.

In a second example embodiment as best presented in FIGS. 2 and 3, the plurality of outside projections 140 includes a pair of clusters 141 of outside projections 140. Each of the clusters 141 of outside projections 140 are comprised of a plurality of outside projections 140 arranged in an arc shape with the clusters 141 being mirror images of one another on opposite sides of the second plane B for being engaged by a piston 42. As shown, the clusters 141 are disposed in alignment with the engagement face of the piston 42 adjacent to the outer circumference 43 of the engagement face of the piston 42. More specifically, like the arcuate projections 41, the clusters 141 are disposed in alignment with an engagement face of the piston 42 adjacent to an outer circumference 43 of the engagement face of the piston 42, and the arcuate shape of the clusters 141 correlates with the shape of the engagement face of the piston 42. Accordingly, the clusters 141 are shaped and sized for optimal aligned engagement of the clusters 141 and piston 42 without the risk of the piston 42 engaging the insulating layer 34.

Figure 5:
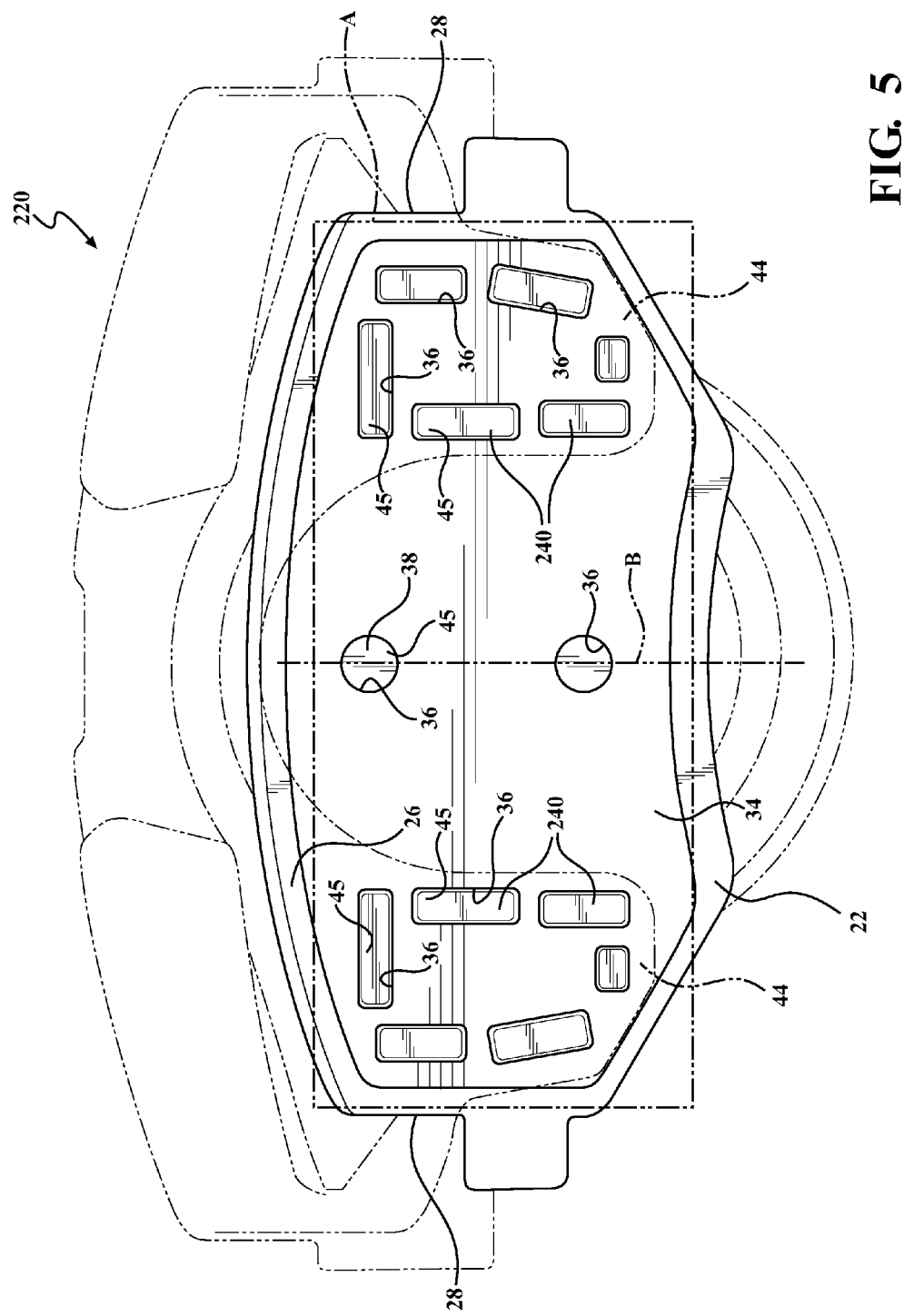
FIG. 5 is a perspective view of a third example embodiment of a brake pad apparatus in engagement with a pair of caliper fingers of a brake assembly.

In a third example embodiment as best shown in FIGS. 5 and 6, the plurality of outside projections 240 includes a pair of assemblages 241 of outside projections 240. Each of the assemblages 241 of projections 240 is comprised of a plurality of outside projections 240 arranged in a generally rectangular shape, with the assemblages 241 being mirror images of one another on opposite sides of the second plane B, each for being engaged by a respective caliper finger 44. More specifically, the assemblages 241 are shaped and sized for optimal aligned engagement with the caliper fingers 44 without the risk of the caliper fingers 44 engaging the insulating layer 34.

It should be appreciated that the projections 38, 40, 140, 240 could be arranged in other configurations to be engaged by the pushing members 42, 44 that have other shapes.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A brake pad apparatus for engaging a rotor of a brake assembly of a vehicle to reduce the speed of the vehicle, said brake pad apparatus comprising:
a backing plate having an inside surface and an outside surface extending along a first plane,
a liner connected to said inside surface of said backing plate for contacting the rotor for creating a frictional force against the rotor to reduce the speed of the vehicle;
an insulating layer having a thickness and connected to said outside surface of said backing plate for providing heat and noise insulation to said backing plate during contact of said liner against the rotor,
a plurality of projections spaced from one another and extending from said outside surface of said backing plate and through said insulating layer and past said thickness of said insulating layer to an engagement surface for engaging a piston and preventing the piston from engaging said insulating member,
said inside surface and said outside surface of said backing plate extending between a pair of sides disposed on opposite sides of a second plane extending perpendicularly to said backing plate and halfway between said sides, and
said plurality of projections including a pair of outside projections each disposed in an arcuate shape and extending between ends to present a concave inside opening to said second plane with said outside projections spaced from one another and being mirror images of one another equally on opposite sides of said second plane whereby said concave insides are bowed away from one another.

2. The apparatus as set forth in claim 1 wherein said engagement surface of each of said projections is planar and extends in spaced and parallel relationship with said outside surface of said backing plate.

3. The apparatus as set forth in claim 2 wherein said projections extend from said outside surface in perpendicular relationship with said first plane.

4. The apparatus as set forth in claim 1 further including a pair of inside projections each of circular shape and disposed between said outside projections and spaced from said outside projections along said second plane and extending from said outside surface of said backing plate and through said insulating layer and past said thickness of said insulating layer for engaging the piston and preventing the piston from engaging said insulating layer.

5. The apparatus as set forth in claim 1 wherein each of said outside projections is one continuous projection having said arcuate shape.

6. The apparatus as set forth in claim 1 wherein each of said outside projections includes clusters of multiple projections with each of said clusters arranged in said arcuate shape and defining said mirror images of one another.

7. The apparatus as set forth in claim 1 wherein said at least one projection is of the same material as said backing plate.

8. The apparatus as set forth in claim 7 wherein said at least one projection is integrally connected to said backing plate.

9. A brake pad apparatus for engaging a rotor of a brake assembly of a vehicle to reduce the speed of the vehicle, said brake pad apparatus comprising:
a backing plate having an inside surface and an outside surface extending along a first plane,
a liner connected to said inside surface of said backing plate for contacting the rotor for creating a frictional force against the rotor to reduce the speed of the vehicle;
an insulating layer having a thickness connected to said outside surface of said backing plate for providing heat and noise insulation to said backing plate during contact of said liner against the rotor;
a plurality of projections spaced from one another and extending from said outside surface of said backing plate and through said insulating layer and past said thickness of said insulating layer to an engagement surface for engaging caliper fingers and preventing the caliper fingers from engaging said insulating member,
said inside surface and said outside surface of said backing plate extending between a pair of sides disposed on opposite sides of a second plane extending perpendicularly to said backing plate halfway between said sides, said plurality of projections including a pair of outside projections each having a rectangular shape and spaced from one another and being mirror images of one another on opposite sides of said second plane with each of said outside projections including an assemblage of projections, whereby each of said projections of said assemblage are spaced from one another and arranged in said rectangular shape.

10. The apparatus as set forth in claim 9 wherein said engagement surface of said at least one projection is planar and extends in spaced and parallel relationship with said outside surface of said backing plate.

11. The apparatus as set forth in claim 10 said projections extends from said outside surface in perpendicular relationship with said first plane.

12. The apparatus as set forth in claim 9 further including a pair of inside projections each of circular shape and disposed between said outside projections along said second plane and extending from said outside surface of said backing plate and through said insulating layer and past said thickness of said insulating layer.

13. The apparatus as set forth in claim 9 wherein each of said outside projections includes an assemblages of projections with each of said assemblages arranged in said rectangular shape and defining said mirror images of one another on opposite sides of said second plane.

14. The apparatus as set forth in claim 9 wherein said at least one projection is of the same material as said backing plate.

15. The apparatus as set forth in claim 14 wherein said at least one projection is integrally connected to said backing plate.

\* \* \* \* \*